Jan. 18, 1949.    A. B. SKROMME    2,459,751
MOLDED RUBBER TRACTION CHAIN

Filed Aug. 1, 1945    2 Sheets-Sheet 1

INVENTOR
ARNOLD B. SKROMME.
BY
ATTORNEYS

Jan. 18, 1949.     A. B. SKROMME     2,459,751
MOLDED RUBBER TRACTION CHAIN
Filed Aug. 1, 1945     2 Sheets-Sheet 2
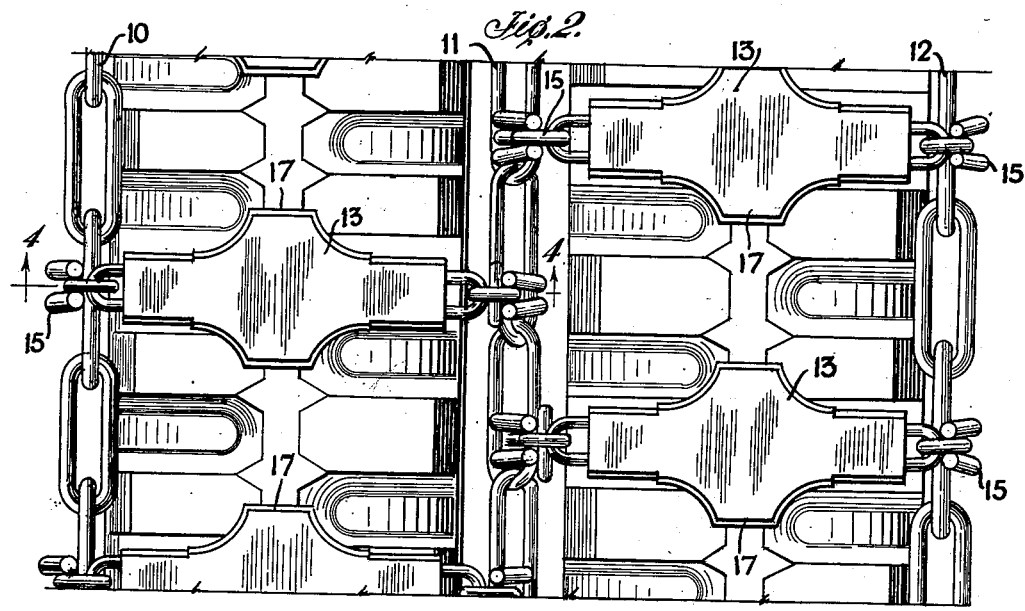
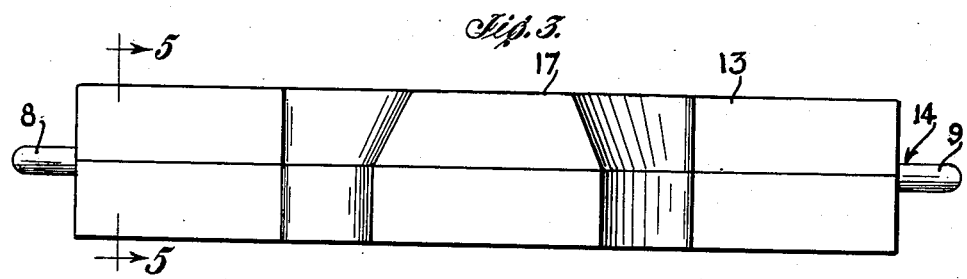
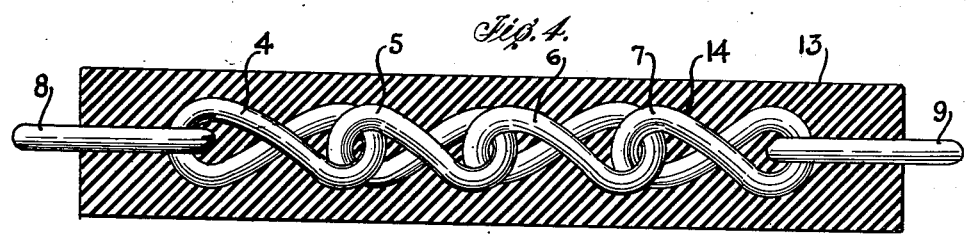
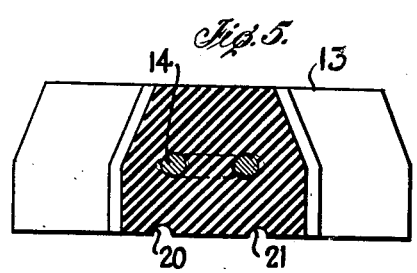
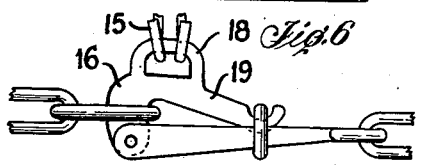
INVENTOR
ARNOLD B. SKROMME
BY
*Ely & Frye*
ATTORNEYS Patented Jan. 18, 1949

2,459,751

UNITED STATES PATENT OFFICE 2,459,751

MOLDED RUBBER TRACTION CHAIN

Arnold B. Skromme, Akron, Ohio, assignor to The Firestone Tire & Rubber Company, Akron, Ohio, a corporation of Ohio Application August 1, 1945, Serial No. 608,215

3 Claims. (Cl. 152—221)

This invention relates to traction devices for rubber tires, traction wheels and tracks, and an object of the present invention is to improve generally upon such devices and particularly to provide a device of this character which is an improvement upon steel tire chains now used in considerable volume.

Another object of the present invention is to provide a traction device having improved traction effort over such devices of which applicant has knowledge.

A further object is to produce a traction device that will reduce chafing to a minimum.

Still another object of the present invention is to provide a traction device that is free of objectionable noise when run on a hard surfaced road.

A still further object of the present invention is to provide a traction device which permits increased vehicle speed over the speed possible with traction devices heretofore known.

Yet another object of the present invention is the provision of a detachable traction device that has a greater thickness than is practical with a tire chain.

The number of trucks and tractors used in off-the-road operations has and is increasing rapidly. Such service requires tires, half tracks and the like to be equipped with traction devices to afford effective traction effort in deep mud, soft earth and the like, and at the same time be adapted for use on a hard road so that, for example, a truck with tires equipped with such devices may be run over an improved road surface at reasonably high speed without injury to the road surface, the tire, or the device itself and without objectionable noise. One type of traction device presently used to considerable extent for off-the-road operations is a cross chain similar to the nonskid tire chains which have been in common use for a number of years. The chain type of traction device, however, is not entirely satisfactory for truck tires in off-the-road operations for the principle reasons that to provide the traction required in soft ground the chain links must be so large that when the device is used on a hard road surface the chain gouges and chafes the tread rubber, is extremely noisy, and if the truck is run at only moderate speed the chains beat themselves against the road surface with such force that both the road and chain are injured. Another fault of the large traction chains in off-the-road operations is that the chains retain mud or earth on the tire until the chain becomes entirely covered and ceases to function effectively.

Nonskid tire chains, however, are conveniently applied to and removed from tires, as has been demonstrated by their long acceptance by the public. The present invention retains the advantages of cross chains in respect to its ease of application while at the same time overcoming the objections of heavy chains. This is accomplished by utilizing a cross chain as an anchor or strain member for a molded rubber traction block. Applicant has found a length of chain an effective anchor member for such rubber blocks and has provided a traction element which is easily and quickly applied, removed, or cross members replaced, and which avoids the objections of steel chains set out hereinabove. It is to be understood however that the invention is not to be limited to the use of chains as anchor strain members, but that in place of chains, cables, bars or the like may be used within the spirit of the invention.

In the accompanying drawings which illustrate one embodiment of the invention and wherein similar characters of reference indicate corresponding parts in all views, Fig. 1 is a perspective view of a dual tire and wheel assembly with traction devices embodying the present invention mounted in operative position on the tires;

Fig. 2 is a partial plan view of the assembly shown in Fig. 1;

Fig. 3 is a side elevation of one of the cross members;

Fig. 4 is a sectional view on line 4—4 of Fig. 2;

Fig. 5 is a sectional view on line 5—5 of Fig. 3; and

Fig. 6 is a fragmentary view in elevation of an end chain fastener adapted for attachment of a cross chain thereto.

Figure 1:
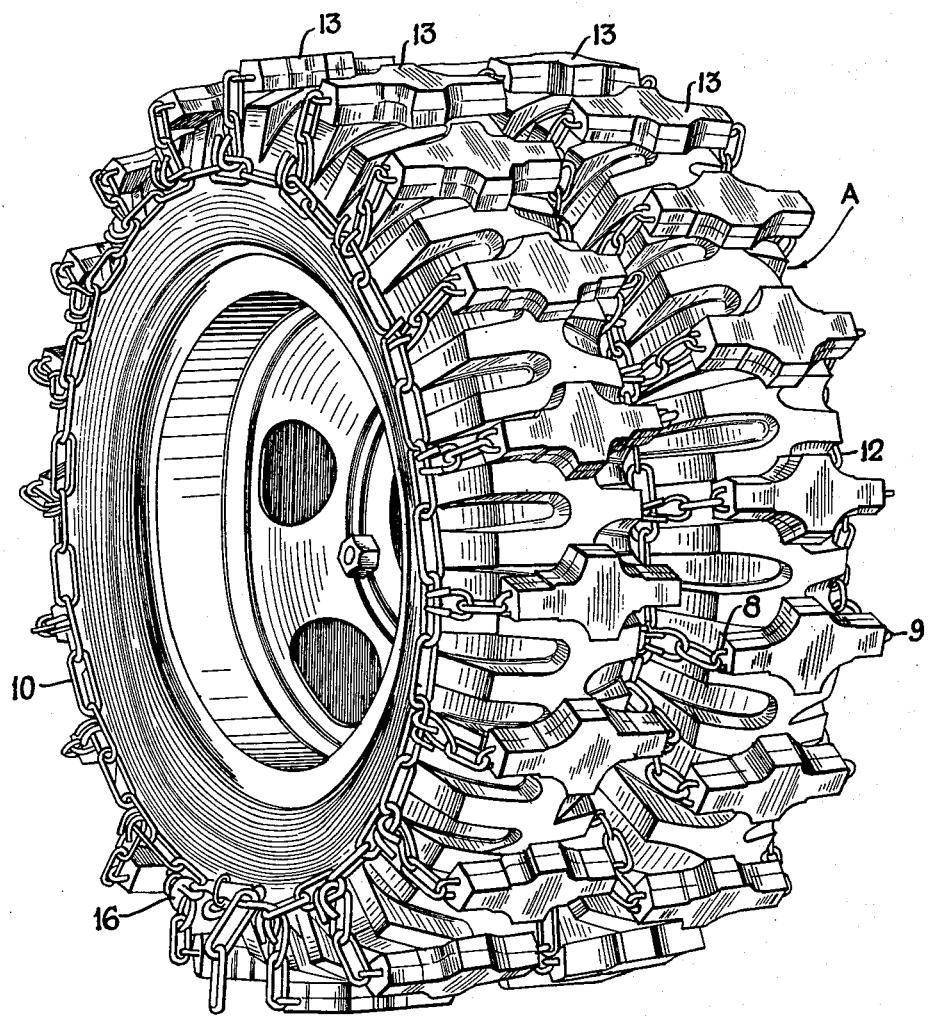

Referring to the drawings, A designates a dual tire and wheel assembly with the traction device embodying the invention applied thereto, said device comprising side or tie chains 10, 11 and 12, and individual traction members 13 composed of rubber, or rubber like composition molded about and anchored on the central portions of cross chains 14. End links 15 of the cross chains are attaching links adapted to hook into the links of said side chains at intervals around the dual tires. The side chains are provided with end fastening means 16 which may be hooked into whatever links of the end chains which will give the proper tautness to the side chains, as will be understood by those familiar with the art. It has been found, however, that side chain end fasteners heretofore used were not entirely satisfactory for use with the traction members of the present invention, consequently, special end members 16, shown in detail in Fig. 6, having means for attachment of a cross chain of a traction member 13 thereto was constructed in order to provide proper spacing of the traction members at the ends of the side chains.

The cross chains 14 extend longitudinally through the traction members 13 and comprise twisted links 4, 5, 6 and 7 intermediate flat end links 8 and 9. By reference to Figs. 4 and 5, it will be seen that the twisted links are arranged centrally through the rubber of member 13 with the links 4, 5, 6 and 7 lying in a position relative to the base of member 13 which, for the want of a more accurate expression, is described as flat. At any rate, links 4, 5, 6 and 7 are so positioned as to be buried in the rubber as deeply as possible. The use of the twisted link through the center of the rubber traction member avoids localizing the stresses in the links when the traction member is in operative contact with the ground. By using a twisted link the necessary strength is obtained in a link which link does not lie so close to the surface of traction member 13 that in service the link will rupture said traction member.

The traction members 13 extend across the tops of the treads of said tires and are movably anchored on said tires by means of the cross chains 14, as will also be understood by those familiar with the art. Traction members 13 are rugged thick members having wide central portions 17, and may be molded to conform to the contour of the tire tread on which they are to bear.

The traction members 13 are spaced circumferentially about the treads of said tires so that the wide portions 17 are close enough together to avoid pronounced jarring of a vehicle on which they are used when such vehicle is run over a hard surfaced road. However, the traction members are spaced apart a distance sufficient to present an open rugged traction surface to the mud or soft earth. By way of illustration, but without limitation, a satisfactory traction member 13 and arrangement of same for a 7.50–20 tire is traction elements of rubber 7¼ inches long, 1 1/16 inches wide at the bottom of its narrow portion, 3⅞ inches wide at the bottom of its wide portion and 1⅜ inches thick, with 20 individual traction members 13 circumferentially and uniformly spaced about the tread of the tire. It will be noted that to avoid a gap wider than the regular spacing of the traction members at the ends of the side chains that the special end members 16 of the side chains receive attaching links 15.

The traction member 13 being of rubber or rubber like material and having a large tire tread contact area does not injure the surface of the road and does not cut or gouge into the tread rubber.

Since applicant's device does not injure the road or the tire, or other traction wheel or track on which it may be used, it may have greater thickness than some other types of traction devices such as, for example, chains, metal cleats and the like. The present device is self cleaning as its movement relative to the tire tread is pronounced; consequently the members 13 do not become covered with mud or earth and for that reason they provide their maximum tractive effort regardless of the nature of the mud or soil in which they are used. The relative movement between the traction element 13 and the tire tread is controlled or at least influenced by several factors such as the sudden starting, tightness of chains, area of contact surface between tire tread and traction element, etc. However, it has been found that two longitudinal grooves 20 and 21, extending the length of said traction element, adds a desirable resistance against the traction element sliding on said tread. Corners and edges of a tire tread catch in said grooves 20 and 21 thus leaving less work for the cross chains and end chains to do. Thus, between the chains and the grooves 20 and 21, said relative movement between tire tread and traction elements is purposely effected.

In order to provide the close spacing of the traction members 13 necessary to avoid a break in the smooth running of the assemblies it was found necessary, as indicated hereinabove, to provide special side chain end fasteners 16 to which cross chains could be attached. By reference to Fig. 6 it will be seen that end fastener 16 is provided with a link 18 attached to a pivoted arm 19 of the fastener. The arm 19, together with the link 18, may be a single stamping, or the link 18 may be welded to the arm 19 which may be manufactured in any manner found satisfactory. Link 18 receives the end attaching links 15 of the cross chains in similar manner as do the links of the side chains.

From the foregoing description taken in connection with the accompanying drawing, the advantages of the construction and method of operation will be readily understood by those skilled in the art to which the invention pertains. A dual tire assembly has been shown, but, obviously, the invention is adapted for use in such arrangements as a single tandem or dual tandem. While the invention has been described in connection with but one embodiment thereof, it is to be understood that the device shown is merely illustrative and that such changes may be made when desired as fall within the scope of the appended claims.

I claim:

1. A detachable traction device adapted for mounting on a vehicle tire to supplement the tractive resistance of the tire, said device comprising a pair of side chains adapted to encircle the tire in the region of the base of the tread portion, means for detachably connecting the ends of said side chains, and a multiplicity of pliable traction links interconnecting said side chains at equal intervals to engage the tread portion of a tire and to be positioned transversely thereof and maintained in engagement therewith by contractile bias imparted by said side chains, each said traction link comprising an elongate molded element of vulcanized rubber-like composition provided with a metallic multiple-link chain completely embedded and vulcanized therein along the longitudinal axis of said element, said element being provided when undistorted with planate tread contacting and ground engaging surfaces and being thicker between said surfaces than the transverse dimension of the chain links and of a width at least twice the transverse dimension of said chain links.

2. The device of claim 1 in which said links are spaced to provide, when mounted, an inter-link spacing, circumferentially of the tire, not substantially greater than the width of each individual link.

3. A device as described in claim 1 wherein the chain links are of a length whereby the tread block molded thereon extends from a mid-portion of one link to the mid-portion of another link spaced therefrom, said spaced links having one end portion embedded and vulcanized in said tread blade and an opposite end portion extending therefrom for engagement with associated links, said partially embedded links being disposed with the major plane thereof aligned with the major horizontal plane of the treadbar.

ARNOLD B. SKROMME.

REFERENCES CITED

The following references are of record in the file of this patent:

UNITED STATES PATENTS

| Number | Name | Date |
|---|---|---|
| 1,253,113 | Weed | Jan. 8, 1918 |
| 1,329,838 | Howell | Feb. 3, 1920 |
| 1,476,606 | Hall | Dec. 4, 1923 |
| 1,515,491 | Jordan | Nov. 11, 1924 |
| 1,577,684 | Bond | Mar. 23, 1926 |
| 1,783,161 | Stewart | Nov. 25, 1930 |
| 1,872,003 | Pratt | Aug. 16, 1932 |
| 1,953,495 | Nargi | Apr. 3, 1934 |

FOREIGN PATENTS

| Number | Country | Date |
|---|---|---|
| 518,866 | Germany | 1931 |